July 6, 1954
A. PRESZLER
2,683,026
BEARING DEVICE FOR CONCRETE MIXERS
Filed Sept. 25, 1952
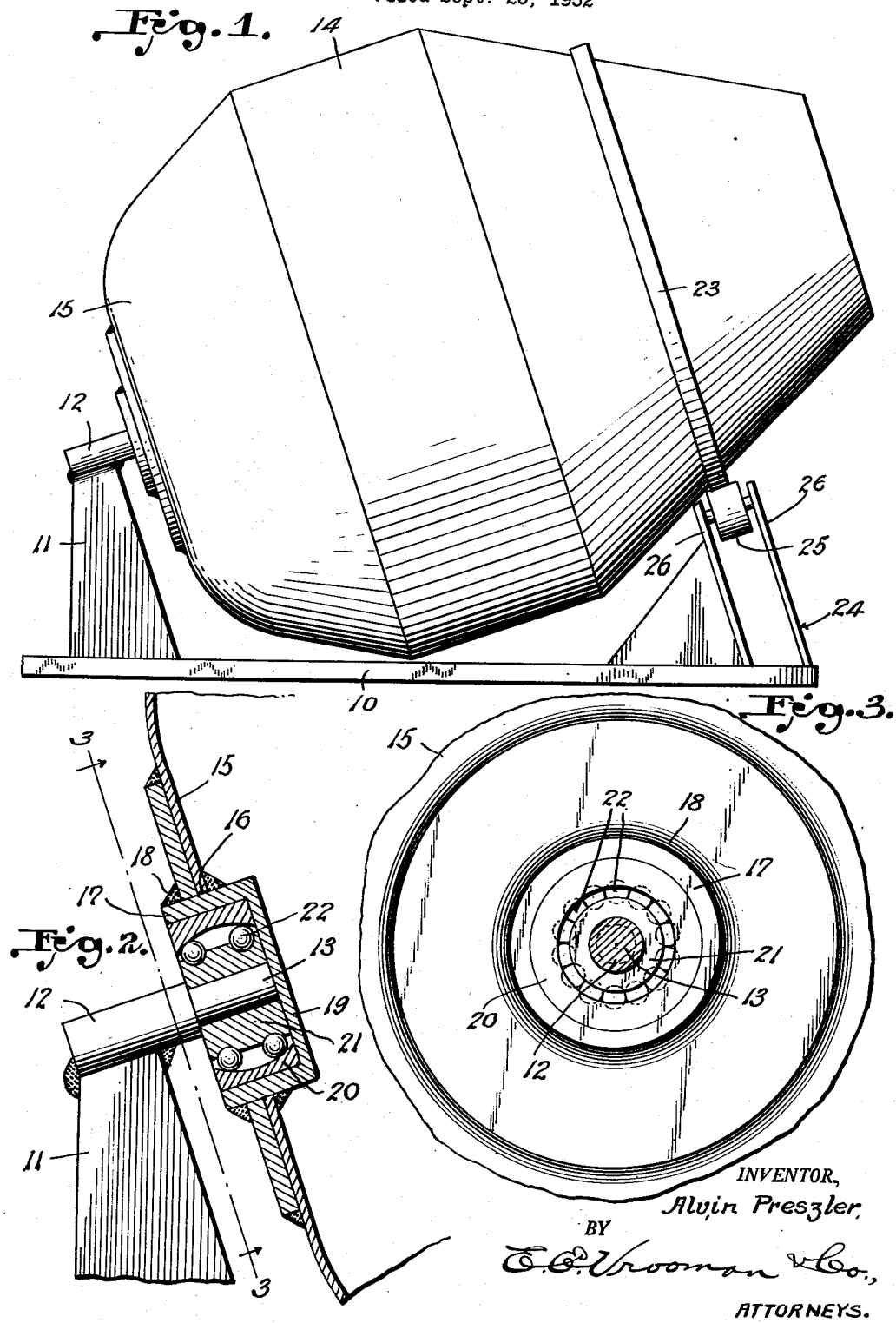
INVENTOR,
Alvin Preszler
BY
E. E. Vrooman & Co.,
ATTORNEYS.

Patented July 6, 1954

2,683,026

UNITED STATES PATENT OFFICE 2,683,026

BEARING DEVICE FOR CONCRETE MIXERS

Alvin Preszler, South Gate, Calif.

Application September 25, 1952, Serial No. 311,379

1 Claim. (Cl. 259—176)

This invention relates to rotary concrete mixers and has special reference to a bearing device for revolving drum concrete transit mixers.

In the usual construction of mixers of this type it is customary to attach centrally of the head of the mixing drum a journal or axle member which projects from the head and is engaged by a suitable bearing device preferably of the self alining type. The drum shell is not of very thick material and it is found that no matter how much spread there is given to the end of the journal which is fixed to the shell head, an area surrounds the attachment wherein serious flexing stresses occur so that cracks are apt to develop in the head within such area. Moreover, in such constructions, it is difficult to keep the journal short enough to make the stresses developed by the moment arm negligible.

The principal object of the present invention is to provide a support for the head, wherein all tendency to develop pending flexures in the head is eliminated.

A second important object of the invention is to provide a head bearing for a rotary mixing drum in which the center of the head will coincide with the longitudinal center of the bearing, the head being thus supported at equal distances within the head and without the head.

A third important object of the invention is to provide a device of this character wherein the bearings will be self-alining.

The invention consists in general of certain novel details of construction and combinations of parts hereinafter fully described, illustrated in the accompanying drawings, and particularly claimed.

In the accompanying drawings like characters of reference indicate like parts, and:

Fig. 1 is a side elevation showing a portion of a truck platform and a rotary mixing drum supported thereon.

Fig. 2 is an enlarged view of the head support, the view being partly in elevation and partly in vertical section.

Fig. 3 is a detailed section on the line 3—3 of Fig. 2.

In the embodiment of the invention as here provided, there is disclosed a portion 10 of a platform such as a truck platform. At one end of this portion there is provided a rigid and solidly fixed upright 11 on the upper end of which is fixedly mounted a suitable shaft 12 having a reduced end 13. This suitable shaft is inclined from the horizontal to the same angle as that of a rotary mixing drum 14 having a head portion 15. Centrally of this head portion there is provided a circular opening 16. In this opening is fitted a circular bearing housing 17 firmly attached to the head 15 as, for instance, by welding 18. The inner end of this housing is closed as at 19 so that no concrete or water can enter the housing from the drum. Within the housing is fitted an outer bearing ring at 20 and an inner bearing ring 21. Between the inner and outer bearing rings or races are arranged anti-friction bearings 22. These bearings are here shown as being spaced so that one row lies within the drum at the same distance as the other row lies without the drum. In other words, the plane of the head passes centrally between the rows of bearings. While the bearings here shown are of the ball type, yet it is obvious that any desired type may be used. It will be noted that the interior of the outer face is transversely curved so that any variation in direction between the axis of the stub shaft 12 and the axis of the drum will be met by the self-alining feature of the bearing just described.

Adjacent the forward end of the drum there is provided a peripheral ring 23 and on the forward part of the platform 10 is mounted a support 24, carrying rollers 25 which are journalled between jaws 26 formed on the support. The ring 23 rests on the rollers 25 and due to the support at each end portion of the drum, the same may be readily rotated by any suitable means such as is well known in the art but is not deemed necessary here to be illustrated.

What is claimed is:

In a concrete mixer, a revoluble drum having a longitudinal axis and a shell symmetrically disposed about said axis, said shell having a head end provided with a centrally disposed opening, a bearing housing fitted in said opening and fixedly secured to the head, said housing having a closed inner end, said housing having a flat plate reinforcing the inner end of the shell, said plate surrounding said housing, a bearing ring fitted in said bearing housing, said housing projecting into the drum and projecting outwardly from the head of the drum, a ball race fitted in said housing and having its inner surface concentrically curved on the center of the axis of the member, a fixed support having a reduced end projecting axially into said housing on the axis thereof, said bearing ring fitted on said projecting end and provided with ball receiving grooves spaced longitudinally of the axis of said reduced end, and balls fitted in said grooves and engaging said bearing ring and ball race.

References Cited in the file of this patent

UNITED STATES PATENTS

| Number | Name | Date |
|---|---|---|
| 1,400,754 | McCuen | Dec. 20, 1921 |

FOREIGN PATENTS

| Number | Country | Date |
|---|---|---|
| 262,519 | Great Britain | Dec. 13, 1926 |
| 816,824 | Germany | Oct. 15, 1951 |